(12) United States Patent
Chen

(10) Patent No.: US 11,388,574 B2
(45) Date of Patent: *Jul. 12, 2022

(54) METHODS AND APPARATUS FOR PROVIDING ACCESS TO EMERGENCY SERVICE PROVIDERS

(71) Applicant: TBD Safety, LLC, Lewes, DE (US)

(72) Inventor: Hing-Tack Chen, Fresh Meadows, NY (US)

(73) Assignee: TBD SAFETY, LLC, Lewes, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/269,388

(22) Filed: Feb. 6, 2019

(65) Prior Publication Data

US 2019/0174291 A1 Jun. 6, 2019

Related U.S. Application Data

(60) Continuation of application No. 16/034,081, filed on Jul. 12, 2018, now abandoned, which is a
(Continued)

(51) Int. Cl.
*H04W 4/90* (2018.01)
*H04M 1/72412* (2021.01)
(Continued)

(52) U.S. Cl.
CPC ............. *H04W 4/90* (2018.02); *H04M 1/675* (2013.01); *H04M 1/72412* (2021.01);
(Continued)

(58) Field of Classification Search
CPC ............. H04M 11/04; H04M 1/72536; H04M 1/72547; H04M 3/2281; H04M 3/46;
(Continued)

(56) References Cited

U.S. PATENT DOCUMENTS

| 6,675,006 | B1 * | 1/2004 | Diaz | ................... B60R 25/1004 |
| | | | | 455/404.1 |
| 7,991,381 | B1 * | 8/2011 | Dunne | ................... B60R 25/00 |
| | | | | 379/33 |

(Continued)

*Primary Examiner* — Allahyar Kasraian
(74) *Attorney, Agent, or Firm* — Royal W. Craig; Gordon Feinblatt LLC

(57) ABSTRACT

A method and apparatus of communication via a hand held device that includes receiving an indication at the device to initiate an emergency call via a wireless network; determining whether the device is configured with a subscriber identity module (SIM) card, wherein the SIM card includes a plurality of numbers; and sequentially calling the plurality of numbers stored on the SIM card based on the determination that the device is configured with the SIM card. Further, the method and apparatus include detecting an emergency indication; connecting to a wireless network; and establishing a communication with one or more emergency service providers based at least in part on detecting the emergency indication, wherein the communication is established via the wireless network.

17 Claims, 6 Drawing Sheets

Related U.S. Application Data continuation of application No. 15/608,252, filed on May 30, 2017, now abandoned, which is a continuation of application No. 15/148,779, filed on May 6, 2016, now Pat. No. 9,699,636, which is a division of application No. 14/563,366, filed on Dec. 8, 2014, now Pat. No. 9,402,173.

(60) Provisional application No. 61/913,107, filed on Dec. 6, 2013.

(51) Int. Cl.
*H04M 1/72418* (2021.01)
*H04M 1/72457* (2021.01)
*H04M 1/675* (2006.01)
*H04M 1/2745* (2020.01)

(52) U.S. Cl.
CPC ... *H04M 1/72418* (2021.01); *H04M 1/72457* (2021.01); *H04M 1/2745* (2013.01)

(58) Field of Classification Search
CPC ............ H04M 3/5116; H04M 2242/04; G08B 25/006; H04W 4/22; H04W 76/007
USPC .................... 455/404.1, 404.2, 558
See application file for complete search history.

(56) References Cited

U.S. PATENT DOCUMENTS

| | | | | |
|---|---|---|---|---|
| 8,588,733 | B2 | 11/2013 | Ferguson et al. | |
| 2001/0017912 | A1* | 8/2001 | Baum | H04M 11/04 379/40 |
| 2005/0239477 | A1* | 10/2005 | Kim | H04W 4/90 455/456.1 |
| 2006/0003809 | A1* | 1/2006 | Boling | G08B 15/00 455/564 |
| 2006/0073838 | A1* | 4/2006 | Kamali | A61B 5/0002 455/456.1 |
| 2006/0195891 | A1* | 8/2006 | Freyman | H04L 67/36 726/4 |
| 2007/0206729 | A1* | 9/2007 | Baum | H04M 11/04 379/37 |
| 2008/0064365 | A1 | 3/2008 | Lang et al. | |
| 2008/0319562 | A1 | 12/2008 | Forstall | |
| 2009/0227223 | A1* | 9/2009 | Jenkins | H04M 11/045 455/404.1 |
| 2009/0289784 | A1 | 11/2009 | Sid | |
| 2010/0003950 | A1* | 1/2010 | Ray | G10L 13/043 455/404.1 |
| 2010/0099383 | A1* | 4/2010 | Yamagishi | H04M 1/673 455/411 |
| 2010/0124900 | A1 | 5/2010 | Lui et al. | |
| 2010/0190468 | A1 | 7/2010 | Scott et al. | |
| 2011/0194553 | A1 | 8/2011 | Sahin et al. | |
| 2012/0135703 | A1 | 5/2012 | Hartt | |
| 2012/0295575 | A1 | 11/2012 | Nam | |
| 2013/0040618 | A1 | 2/2013 | D'Amato et al. | |
| 2013/0225118 | A1* | 8/2013 | Jang | H04W 4/90 455/404.2 |
| 2014/0106699 | A1 | 4/2014 | Chitre et al. | |
| 2014/0120901 | A1 | 5/2014 | Ward et al. | |
| 2014/0335823 | A1* | 11/2014 | Heredia | H04L 51/38 455/411 |
| 2014/0370838 | A1 | 12/2014 | Kim et al. | |
| 2015/0126234 | A1 | 5/2015 | Rodriguez | |

* cited by examiner

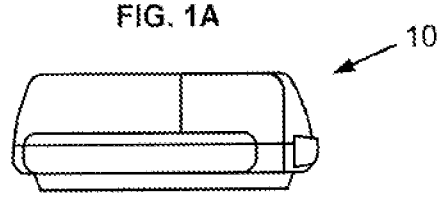
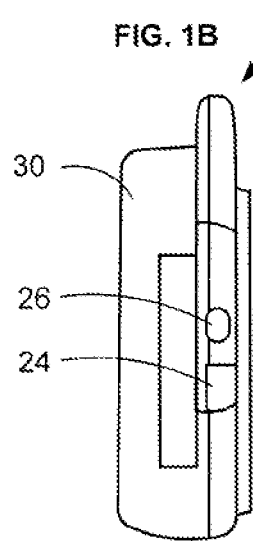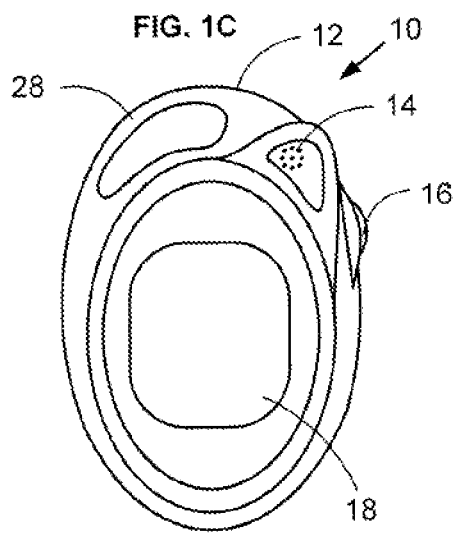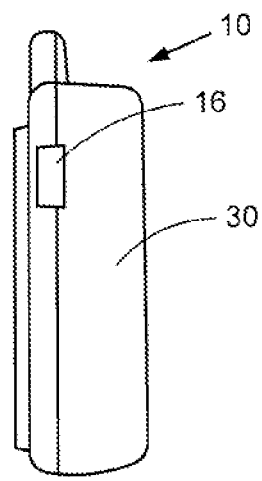
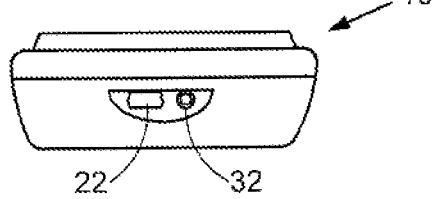

METHODS AND APPARATUS FOR PROVIDING ACCESS TO EMERGENCY SERVICE PROVIDERS

CLAIM OF PRIORITY UNDER 35 U.S.C. § 119

The present application for patent is a Continuation application of U.S. patent application Ser. No. 16/034,081, filed on Jul. 12, 2018, which is a Continuation Application of U.S. patent application Ser. No. 15/608,252, filed on May 30, 2017, which is a Continuation Application of U.S. patent application Ser. No. 15/148,779, filed on May 6, 2016, now U.S. Pat. No. 9,699,636 issued Jul. 4, 2017, which is a Divisional Application of U.S. patent application Ser. No. 14/563,366, filed on Dec. 8, 2014, now U.S. Pat. No. 9,402,173 issued Jul. 26, 2016, which claims priority to Provisional Application No. 61/913,107 entitled "METHODS AND APPARATUS FOR PROVIDING ACCESS TO EMERGENCY SERVICE PROVIDERS" filed Dec. 6, 2013, each of which is hereby expressly incorporated herein by reference.

BACKGROUND

Aspects of the present disclosure relate generally to wireless (e.g., cellular) communication systems, and more particularly, systems for providing access to emergency service providers.

Wireless communication networks are widely deployed to provide various communication services, such as telephony, video, data, messaging, broadcasts, and so on. Such networks require users to have subscriptions for services in order to be provided access to use the networks' resources. Additionally, in some wireless communication networks, poor interference mitigation and/or poor cell coverage may lead to failures in establishing or maintaining network connections.

In some wireless communication networks, a user may not have access to a wireless network or wireless device. As a result, the user may not be able to request or communicate with an emergency service provider. Thus, there remains an unmet need for improvements in providing access to emergency service providers are desired.

SUMMARY

The following presents a simplified summary of one or more aspects of the present invention in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, methods, and apparatuses for communication thereof, comprise detecting an emergency indication; connecting to a wireless (e.g., cellular) network; and establishing a communication with one or more emergency service providers based at least in part on detecting the emergency indication, wherein the communication is established on the wireless network.

Other example aspects, methods, and apparatuses for communication thereof include receiving an indication at a device to initiate an emergency call via a network; such as a wireless network, determining whether the device is configured with a subscriber identity module (SIM) card, wherein the SIM card includes a plurality of numbers; and sequentially calling the plurality of numbers stored on the SIM card based on the determination that the device is configured with the SIM card.

To the accomplishment of the foregoing and related ends, the one or more aspects comprise the features hereinafter fully described and particularly pointed out in the claims. The following description and the annexed drawings set forth in detail certain example features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIGS. 1A-1E show an example of a wireless communication device that may access one or more emergency service providers in accordance with aspects of the present invention;

DETAILED DESCRIPTION

Figure 2A:
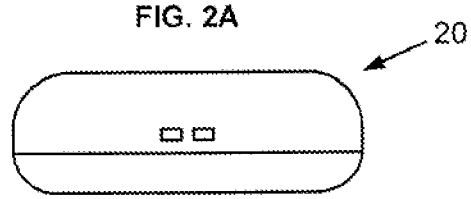
FIGS. 2A-2E show an example of the wireless communication device in accordance with aspects of the present invention.
Figure 2B:
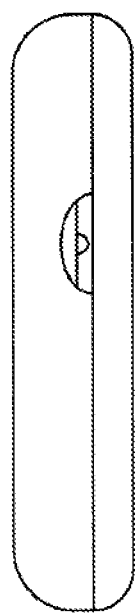
Figure 2C:
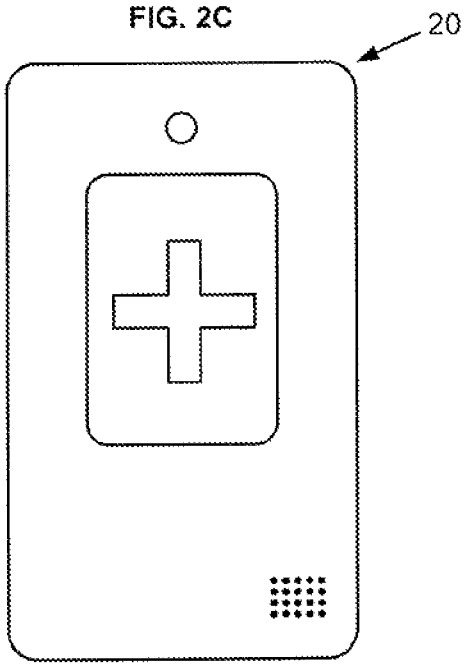
Figure 2D:
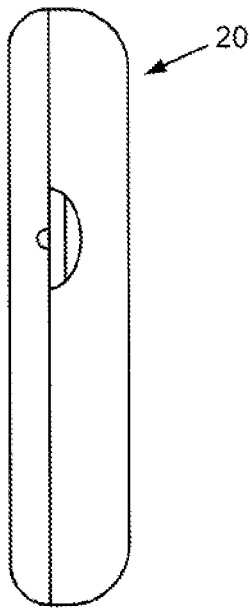
Figure 2E:
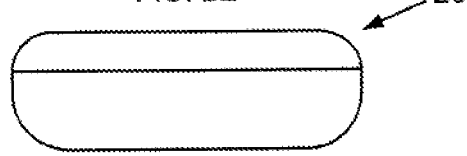

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various aspects of the present invention generally relate to providing access to emergency service providers in case of an emergency. Specifically, a wireless (e.g., cellular) communication device may be configured to connect to a network and establish communication with one or more emergency service providers. In such aspects, the wireless communication device may be configured with a panic button that, when depressed, may cause the wireless device to connect to the network and attempt to establish communication with one or more emergency service providers. Further, the wireless communication device may be configured such that its current location may be determined through triangulation or other location method.

Referring to FIGS. 1A-1E, in one aspect, a wireless communication device 10 includes at least a housing 12, microphone/speaker 14, rocker button 16, display 18, audio port 32, power charger port 22, status indicator 24, panic button 26, lanyard receiving feature 28, and battery compartment 30. Wireless communication device 10 may additionally include a battery (e.g., stored in battery compartment 30) or other power supply feature. In an aspect, wireless communication device 10 may detect an emergency indication (e.g., received from a user); connect to a wireless network; and establish a communication with one or more emergency service providers based at least in part on detecting the emergency indication, wherein the communication is established on the wireless network. In some instances, the wireless communication device 10 may be configured, for example, with an approximate size of 72.5 millimeters (mm) by 47.5 mm by 1.9 mm.

For instance, wireless communication device 10 may communicate with a network (e.g., see FIG. 4) through one or more network entities when panic button 26 is depressed. In one example, wireless communication device 10 may be configured to detect that panic button 26 has been depressed for a threshold period of time (e.g., 3 seconds). As a result, wireless communication device 10 may transmit a signal to one or more network entities to establish a connection to the network. Once the connection is established, wireless communication device 10 may establish communication with one or more wireless service providers on the network, which may include establishing both voice and data communication between wireless communication device 10 and the one or more wireless service providers. As a result, a user of wireless communication device 10 may initiate a communication (e.g., call) with one or more operators at the one or more emergency service providers in order to resolve the emergency situation. In an optional aspect, microphone/speaker 14 may be configured to output voice announcements for connection status (e.g., dialing, failures, redial, stop dialing). In certain instances, the wireless communication device 10 may connect with a 2G wireless network. Moreover, the wireless communication device 10 may be configured with an International Mobile Station Equipment Identity WED, which may be a preconfigured factory setting.

Additionally, panic button 26 may be configured to selectively power on and off wireless communication device 10 when depressed signal is received, such as when panic button 26 is depressed by a user (said selection being interchangeably referred to herein as the button being "depressed"). In an aspect, wireless communication device 10 may be configured to differentiate between the length of time the panic button 26 is depressed, and, based at least in part on the length of time of the depression; wireless communication device 10 may either turn on/off or detect an emergency indication. In certain aspects, the wireless communication device 10 may be configured to operate in a sleep mode if the panic button 26 is not depressed (e.g., an emergency indication has not been received or when the wireless communication device 10 is turned off). During sleep mode, wireless communication device 10 may operate at a lower level of power consumption, for example. As such, wireless communication device 10 may operate for an extended period of time (e.g., 100 days), subject to the number and duration of activations of an emergency indication.

In another aspect, wireless communication device 10 may include rocker button 16, which may be configured to stop an attempt to establish communications with one or more emergency service providers. In another aspect, rocker button 16 may be configured to end an established communication with one or more emergency service providers. For example, wireless communication device 10 may be configured to detect that rocker button 16 is depressed, and as a result, may stop an attempt to establish communication, or end the established communication. In an additional aspect, rocker button 16 may need to be depressed for a threshold period of time before wireless communication device 10 responds. In on example, the panic button 26 may be configured as a 1.5 centimeters (cm) round button with 2 mm indented at the front of the wireless communication device 10. Further, in certain instances, the wireless communication device 10 may be activated after panic button 26 is pressed for two seconds, for example.

Further, once a user depresses the panic button 26, wireless communication device 10 may determine the current location of wireless communication device 10. The current location may be determined, for example, based on triangulation through one or more network entities (e.g., via a cellular network). In some aspects, a subscriber identity module (SIM) or global positioning system (GPS) may also or alternatively be used to determine the current location. Moreover, the wireless communication device 10 may be waterproof, and include a SIM card of approximate size of 25 mm by 15 mm under the battery compartment 30, for example.

In some aspects, wireless communication device 10 may include a display 18, which may be configured to display text or graphic messages thereon. For example, display 18 may display information regarding the emergency call (e.g., status of the emergency call). Moreover, display 18 may display information regarding the current status of the device (e.g., battery level and/or device mode). In one variation, display 18 may, for example, be a liquid crystal display (LCD), a thin film transistor (TFT) active matrix display, a touch-sensitive screen, or other suitable display.

Further, wireless communication device 10 may include audio port 32 and power charger port 22. In one aspect, audio port 32 may be configured to connect an ear piece (not shown) for use with wireless communication device 10, so as to provide the user audio through the ear piece instead of microphone/speaker 14. Moreover, power charger port 22 may be configured to connect a charger with wireless communication device 10, for example, to recharge a rechargeable battery housed within battery compartment 30 of wireless communication device 10.

Additionally, wireless communication device 10 may include battery compartment 30, which may be configured to house one or more batteries of varying size and type. For example, battery compartment 30 may house standard household batteries (e.g., one or more triple-A size batteries). Further, battery compartment 30 may be detachable so as to allow for removal and replacement of the one or more batteries housed within battery compartment 30. Alternatively, battery compartment 30 may provide for a built in battery which may be recharged via power charger port 22. In certain instances, the battery compartment 30 may be configured to include space for 3 AAA lithium batteries, for example. In these instances, wireless communication device 10 may operate at a power of 4.5 V. Moreover, wireless communication device 10 may operate with a continuous discharge rate of about 1500 mA.

In another aspect, wireless communication device 10 may include status indicator 24, which may be configured to indicate the status of either communication with the one or more emergency service providers or the battery of wireless communication device 10. For example, status indicator 24 may be or include a light emitting diode (LED). As such, status indicator 24 may, for example, turn green when wireless communication device 10 is attempting to establish communications with the one or more emergency service providers. Additionally, status indicator 24 may turn red if the attempt to establish communications fails. Moreover, status indicator 24 may be configured to turn green or red when rocker button 16 is depressed, so as to indicate the status of the battery. For example, the status indicator 24 may turn red to indicate that the batteries in the battery compartment 30 need to be changed, and the status indicator 24 may remain green when the batteries are in good condition. Multiple indicators may similarly be used.

In an optional aspect, wireless communication device 10 may include a lanyard receiving feature 28, which may be configured to provide connection for a lanyard. For example, a user may attach (e.g., tie) a lanyard to wireless communication device 10 through lanyard receiving feature 28, such as to wear wireless communication device 10.

Wireless communication device 10, as described herein may also interchangeably be referred to as a mobile station, a subscriber station, a mobile unit, a subscriber unit, a wireless unit, a remote unit, a mobile device, a wireless (e.g. cellular) device, a wireless communication device, a wireless terminal, a remote terminal, a handset, a terminal, a user agent, a mobile client, a client, or other suitable terminology.

Additionally, the network entity may be a macrocell, picocell, femtocell, access point, relay, Node B, mobile Node B, user equipment (UE) (e.g., communicating in peer-to-peer or ad-hoc mode with UE), or substantially any similar type of component that is able to communication with wireless communication device 10 to provide wireless network access at the wireless communication device 10.

Referring to FIGS. 2A-2E show an alternative example of wireless (e.g., cellular) communication device 20, similar to the wireless communication device 10 of FIGS. 1A-1B. Wireless communication device 20 may be configured to access one or more emergency service providers similar to the wireless communication device 10.

Figure 3:
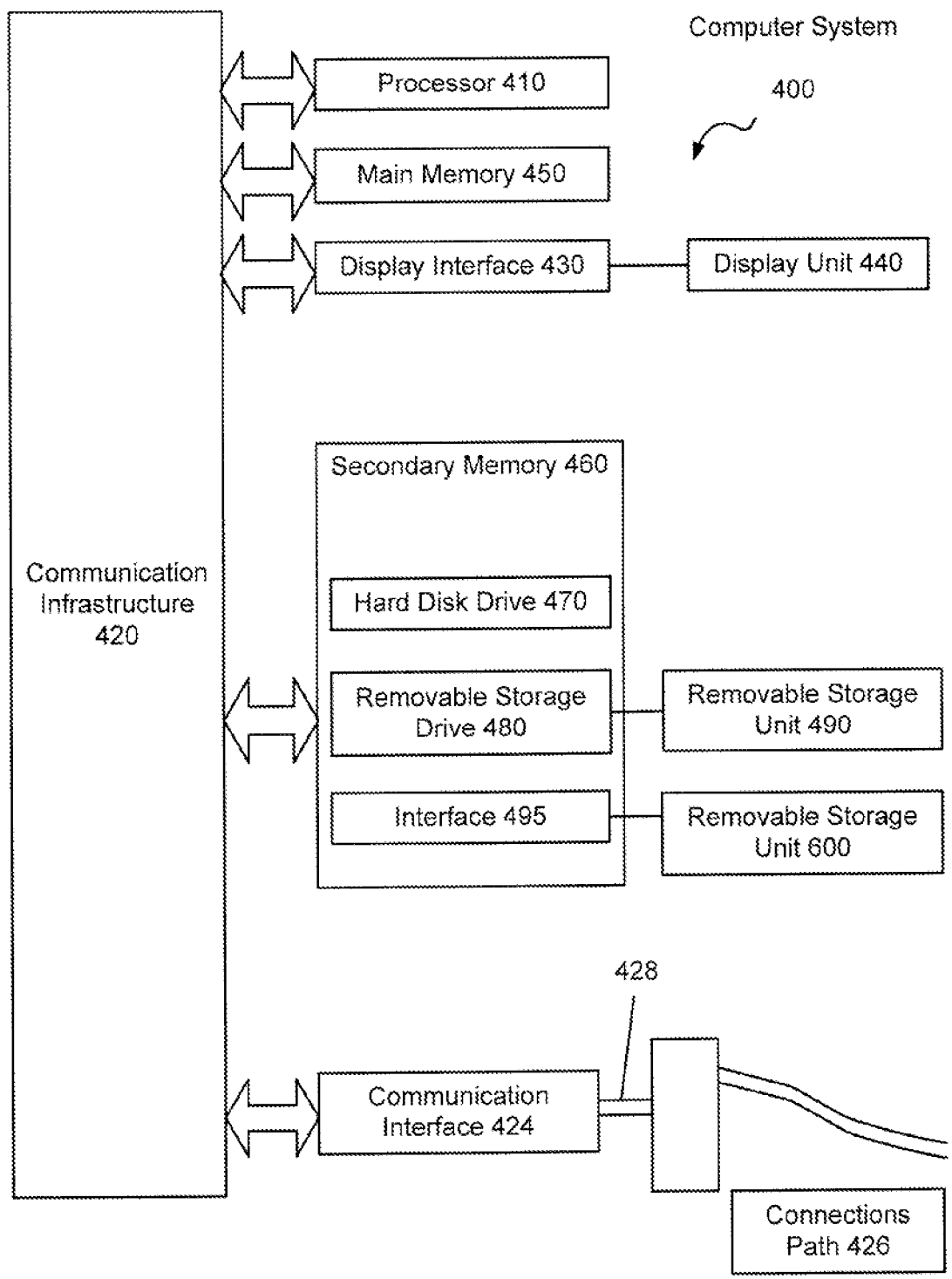
FIG. 3 is a representative diagram of an example computer system capable of carrying out functionality described in example implementations in accordance with aspects of the present invention.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 400 is shown in FIG. 3.

Computer system 400 includes one or more processors, such as processor 404. The processor 410 is coupled to a communication infrastructure 420 (e.g., a communications bus, cross-over bar, or network). Various software aspects are described in terms of this example computer system. After reading this description, it will become apparent to a person skilled in the relevant art(s) how to implement aspects hereof using other computer systems and/or architectures.

Computer system 400 may include a display interface 430 that forwards graphics, text, and other data from the communication infrastructure 420 (or from a frame buffer not shown) for display on a display unit 440. Computer system 400 may include a main memory 450, preferably random access memory (RAM), and may also include a secondary memory 460. The secondary memory 460 may include, for example, a hard disk drive 470 and/or a removable storage drive 480, representing a floppy disk drive, a magnetic tape drive, an optical disk drive, etc. The removable storage drive 480 may read from and/or write to a removable storage unit 490 in a well-known manner. Removable storage unit 490, represents a floppy disk, magnetic tape, optical disk, etc., which may be read by and written to removable storage drive 480. As will be appreciated, the removable storage unit 418 may include a computer usable storage medium having stored therein computer software and/or data.

Alternative aspects of the present invention may include secondary memory 460 and may include other similar devices for allowing computer programs or other instructions to be loaded into computer system 400. Such devices may include, for example, a removable storage unit 490 and an interface 495. Examples of such may include a program cartridge and cartridge interface (such as that found in video game devices), a removable memory chip (such as an erasable programmable read only memory (EPROM), or programmable read only memory (PROM)) and associated socket, and other removable storage units 490 and interfaces 495, which allow software and data to be transferred from the removable storage unit 490 to computer system 400.

Computer system 400 may also include a communications interface 424. Communications interface 424 may allow software and data to be transferred among computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 may be in the form of signals 428 which may be electronic, electromagnetic, optical or other signals capable of being received by communications interface 424. These signals 428 may be provided to communications interface 424 via a communications path (e.g., channel) 426. This path 426 may carry signals 428 and may be implemented using wire or cable, fiber optics, a telephone line, a cellular link, a radio frequency (RF) link and/or other communications channels. As used herein, the terms "computer program medium" and "computer usable medium" refer generally to media such as a removable storage drive 480, a hard disk installed in hard disk drive 470, and/or signals 428. These computer program products may provide software to the computer system 400. Aspects of the present invention are directed to such computer program products.

Computer programs (also referred to as computer control logic) may be stored in main memory 450 and/or secondary memory 460. Computer programs may also be received via communications interface 424. Such computer programs, when executed, may enable the computer system 400 to perform the features in accordance with aspects of the present invention, as discussed herein. In particular, the computer programs, when executed, may enable the processor 410 to perform the features in accordance with aspects of the present invention. Accordingly, such computer programs may represent controllers of the computer system 400.

Where aspects of the present invention may be implemented using software, the software may be stored in a computer program product and loaded into computer system 400 using removable storage drive 414, hard drive 412, or communications interface 424. The control logic (software), when executed by the processor 404, may cause the processor 404 to perform the functions described herein. In another aspect of the present invention, the system may be implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the present invention may be implemented using a combination of both hardware and software.

Figure 4:
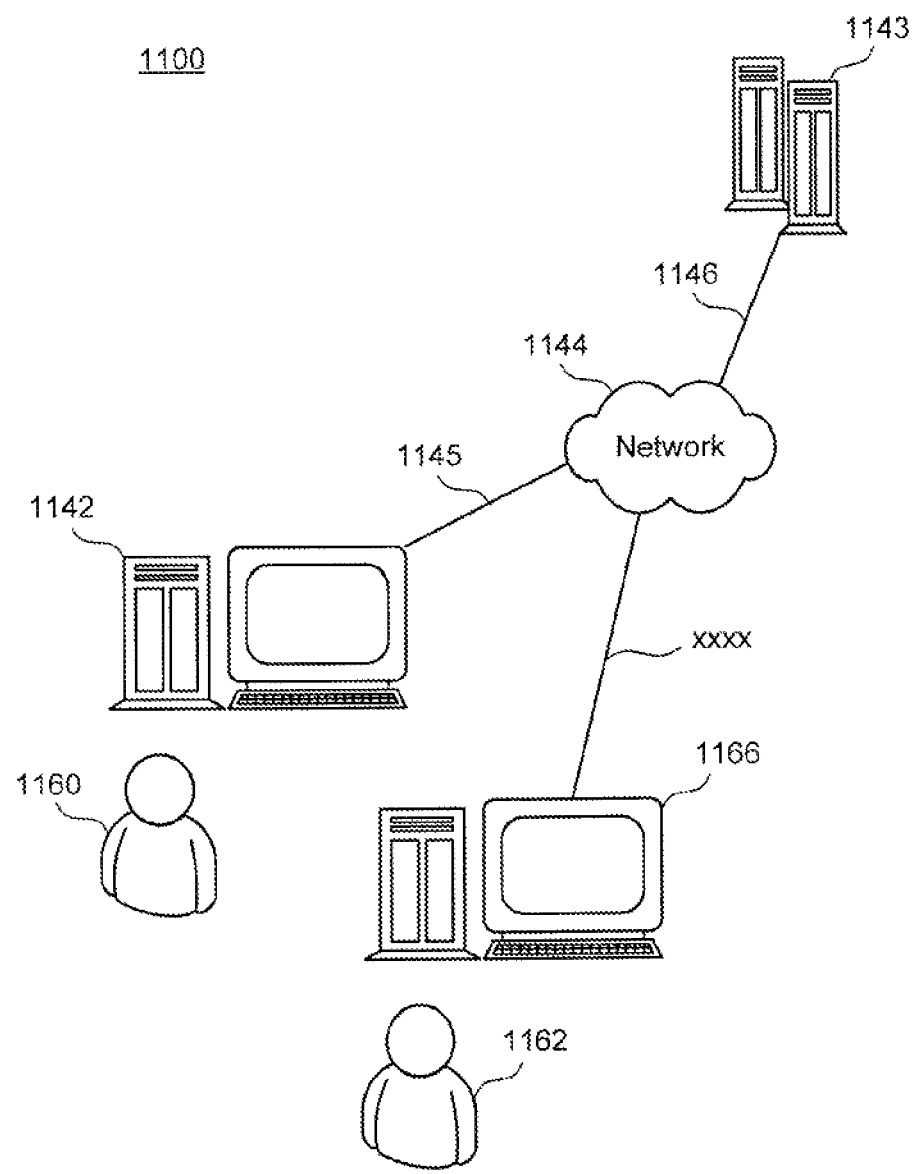
FIG. 4 is a block diagram of various example system components, in accordance with an aspect of the present invention.

FIG. 4 is a block diagram of various example system components for use, in accordance with an aspect of the present invention. FIG. 4 shows a communication system 1100 usable in accordance with the present invention. The communication system 1100 includes one or more accessors 1160, 1162 (also referred to interchangeably herein as one or more "users") and one or more terminals 1142, 1166 (e.g., the wireless communication device 10 of FIGS. 1A-1E). In one aspect, data for use in accordance with the present invention is, for example, input and/or accessed by accessors 1160, 1162 via terminals 1142, 1166, such as personal computers (PCs), minicomputers, mainframe computers, microcomputers, telephonic devices, or wireless devices, such as personal digital assistants ("PDAs"), smart phones, or other hand-held wireless devices (including, but not limited to the wireless communication device 10 of FIGS. 1A-1E) coupled to a server 1143, such as a PC, minicomputer, mainframe computer, microcomputer, or other device having a processor and a repository for data and/or connection to a repository for data, via, for example, a network 1144, such as the Internet or an intranet, and couplings 1145, 1146, 1164. The couplings 1145, 1146, 1164 include, for example, wired, wireless, or fiber optic links. In another variation, the method and system in accordance with aspects of the present invention operate in a stand-alone environment, such as on a single terminal.

Figure 5:
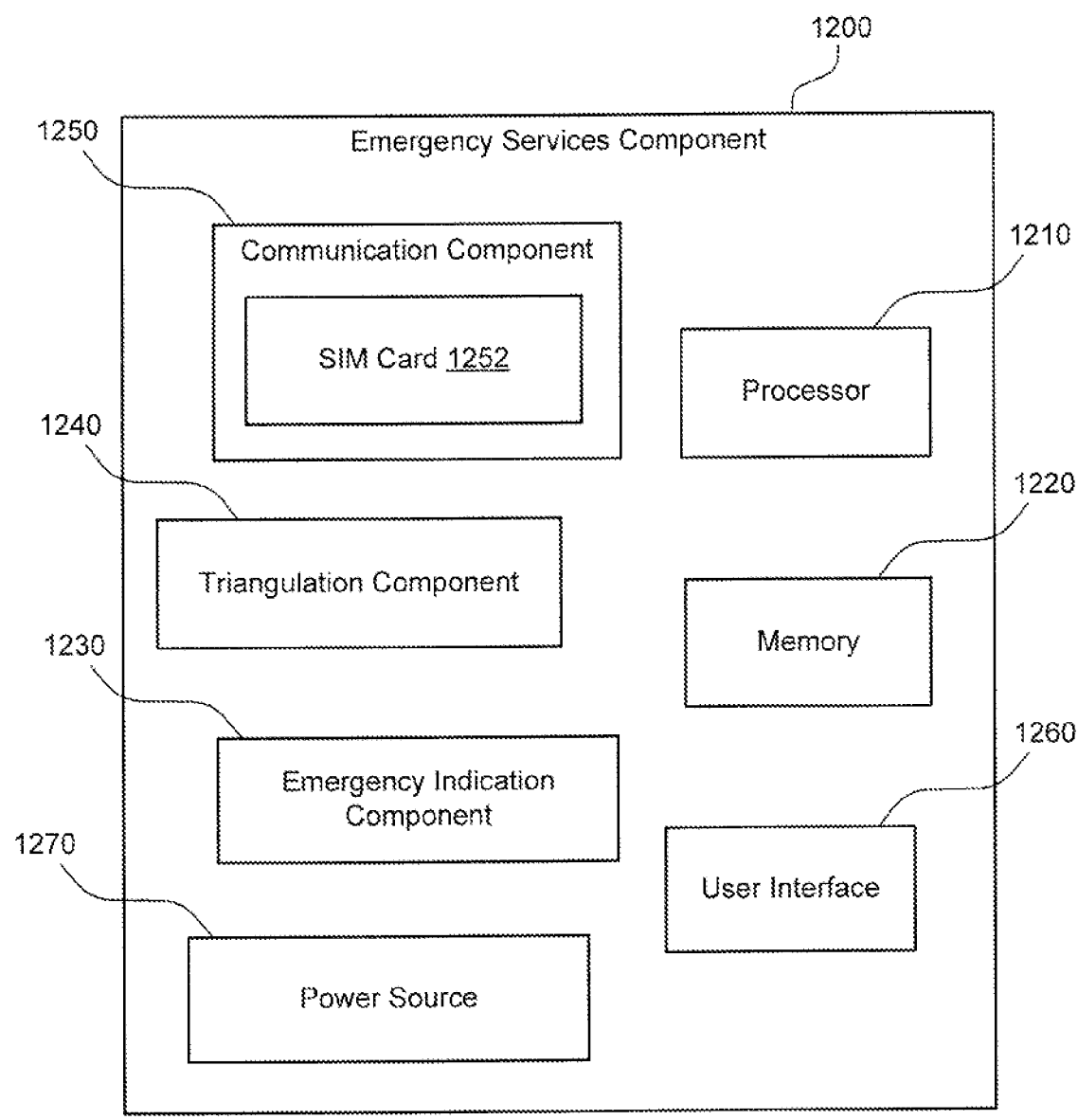
FIG. 5 is a diagram of emergency services component in accordance with an aspect of the present invention.

FIG. 5 is a diagram of an emergency services component 1200 for use in accordance with an aspect of the present invention. The component 1200, for example, may be one implementation of a terminal 1142, 1166, as referred in FIG. 4. In accordance with an aspect of the invention, wireless communication device 10 or 20 (FIGS. 1A-1E and 2A-2E) may be configured to include emergency service component 1200. According to various aspects, the emergency service component 1200 may include a processor 1210, a memory 1220, power source 1270, and a user interface 1260, and may also include a communication component 1250, triangulation component 1240 and an emergency indication component 1230.

In an aspect, communication component 1250 may be configured to manage communication exchange signaling to and from a network. For example, communication component 1250 may include and execute communication protocols and/or manage other standards-specific communication procedures using protocol and/or standards-specific instructions and/or subscription-specific configuration information. that allow communications with one or more network entities and/or networks.

Further, triangulation component 1240 may be configured to determine the location of wireless communication device 10 (FIG. 1). For example, once a user depresses the panic button 26, wireless communication device 10 and/or emergency services component 1200 may execute triangulation component 1240 to initiate determination of the current location of wireless communication device 10. The current location determination may be based on triangulation through one or more network entities. In some aspects, a subscriber identity module (SIM) or global positioning system (GPS) may not be necessary to determine the current location.

Moreover, emergency indication component 1230 may be configured to detect an emergency indication. For example, emergency indication component 1230 may determine whether a user has depressed panic button 26. As a result, emergency indication component 1230 may signal emergency services component 1200 and/or processor 1210 to attempt to connect to one or more emergency service providers.

In another aspect, emergency services component 1200 may include a power source 1270 that may be configured to power the emergency service component 1200 during both sleep mode and when the emergency service component 1200 is engaged in communication. For example, power source 1270 may be stored in a battery compartment, such as battery compartment 30 (FIG. 1), which may be configured to house one or more batteries of varying size and type. In one example, power source 1270 may include one or more batteries (e.g., one or more triple-A size batteries) Further, power source 1270 may be detachable so as to allow for removal and replacement of the one or more batteries housed within the battery compartment. Alternatively, power source 1270 may provide for a built in battery that may be recharged via power charger port 22 (FIG. 1).

Figure 6:
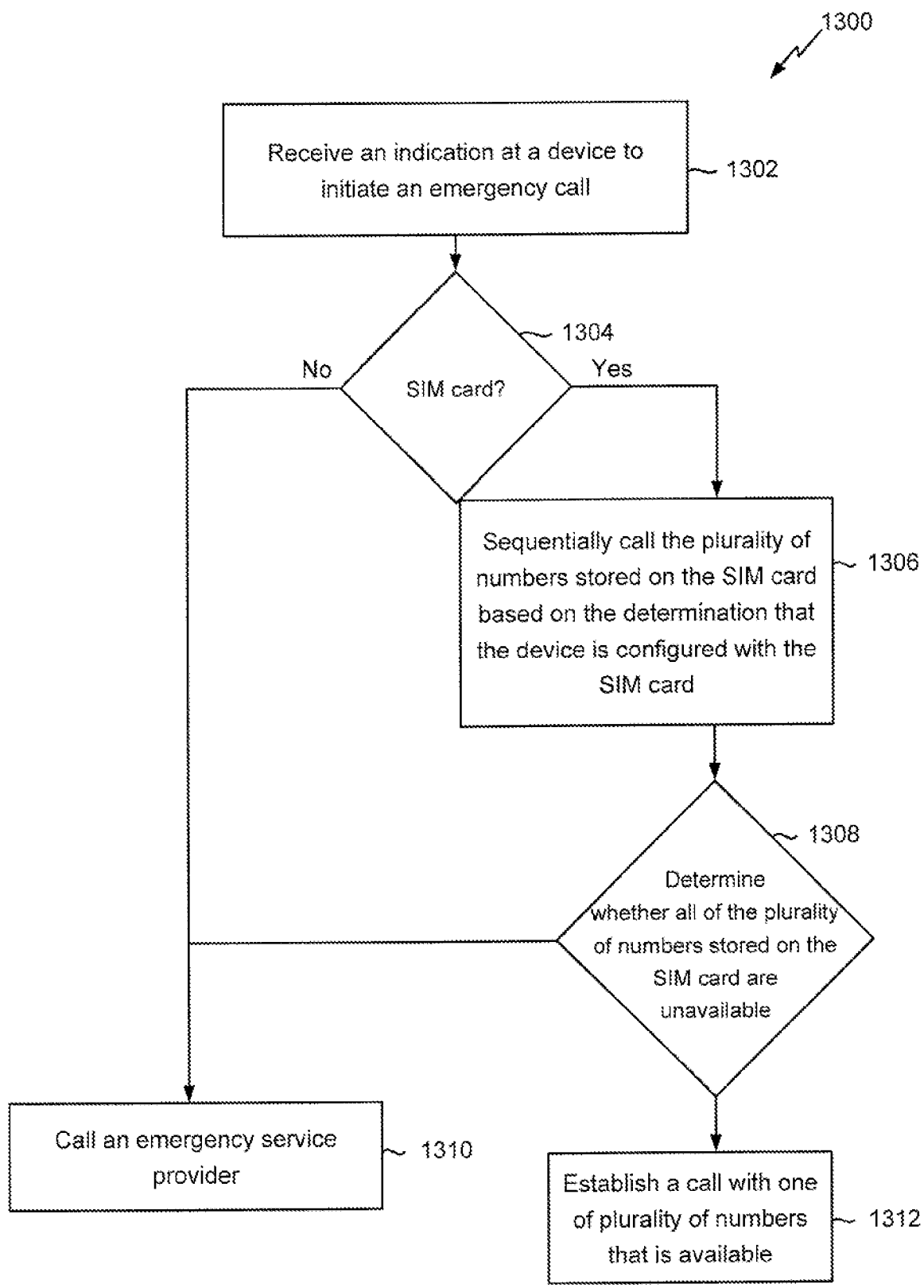
FIG. 6 is a flowchart of an example aspect of a method of communication in accordance with aspects of the present disclosure, such as is shown in FIG. 5.

Referring to FIG. 6, an example method is shown and described as a series of acts for purposes of simplicity of explanation. However, it is to be understood and appreciated that the example method (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

In an example operational aspect, an emergency services component such as emergency services component 1200 (FIG. 5), may perform one aspect of a method 1300 for establishing an emergency call with one or more numbers stored, for example, on a SIM card. At block 1302, method 1300 may receive an indication at a device to initiate an emergency call via a wireless network. For example, as described herein, emergency services component 1200 (FIG. 5) may execute emergency indication component 1230 (FIG. 5) to receive an indication at a device (e.g., the emergency services component 1200) to initiate an emergency call via a wireless network.

Further, at block 1304, method 1300 may determine whether the device is configured with a subscriber identity module (SIM) card. For example, as described herein, emergency services component 1200 (FIG. 5) may execute processor 1210 and/or communication component 1250 (FIG. 5) to determine whether the device (e.g., the emergency services component 1200) is configured with a SIM card 1252.

Moreover, at block 1306, method 1300 may sequentially initiate a call to the plurality of numbers stored on the SIM card based on the determination that the device is configured with the SIM card. For example, as described herein, emergency services component 1200 (FIG. 5) may execute processor 1210 and/or communication component 1250 (FIG. 5) to sequentially call the plurality of numbers stored on the SIM card 1252 based on the determination that the device (e.g., the emergency services component 1200) is configured with the SIM card 1252. In certain instances, sequentially calling the plurality of numbers stored on the SIM card 1252 based on the determination that the emergency services component 1200 is configured with the SIM card 1252 may further comprise calling a first number of the plurality of numbers stored on the SIM card 1252; determining whether the first number is unavailable (e.g., the called first number is engaged/busy); calling a second number of the plurality of numbers stored on the SIM card 1252 based on the determination that the first number is unavailable; and determining whether the second number is available, wherein the emergency services component 1200 is configured to sequentially call the remaining numbers of the plurality of numbers based on the determination that a previously called number is unavailable.

At block 1308, method 1300 may determine whether all of the plurality of numbers stored on the SIM card are unavailable. For example, as described herein, emergency services component 1200 (FIG. 5) may execute processor 1210 and/or communication component 1250 (FIG. 5) to determine whether all of the plurality of numbers stored on the SIM card 1252 are unavailable.

Further, at block 1310, method 1300 may include initiating a call to an emergency service provider. For example, as described herein, emergency services component 1200 (FIG. 5) may execute processor 1210 and/or communication component 1250 (FIG. 5) to call an emergency service provider. In some instances, communication component 1250 may call an emergency service provider based on the determination that all of the plurality of numbers stored on the SIM card 1252 are unavailable. In other instances, communication component 1250 may call an emergency service provider based on the determination that the emergency services component 1200 is not configured with the SIM card 1252 (e.g., block 1304). In certain instances, calling an emergency service provider may comprise initiating a 911 call. Furthermore, emergency services component 1200 may reset an order. of sequentially calling the plurality of numbers stored on the SIM card 1252, such as when the emergency services component 1200 is turned off, wherein resetting the order includes dialing a first number of the plurality of numbers first. For example, if emergency services component 1200 connects with a third number of the plurality of numbers after failing to connect with the first and second numbers and if the emergency services component 1200 is shut down, once the emergency services component 1200 turns on (e.g.; reset) it will dial the first number of the plurality of numbers when emergency indication component 1230 is activated.

At block 1312, method 1300 may establish a call with one of plurality of numbers that is available. For example, as described herein, emergency services component 1200 (FIG. 5) may execute processor 1210 and/or communication component 1250 (FIG. 5) to establish a call with one of plurality of numbers that is available. In some instances, communication component 1250 may call a first number of the plurality of numbers, and the call may be answered, thereby establishing a call between emergency services component 1200 and the first number.

Various aspects of a system in accordance with aspects of the present invention have been presented with reference to a wireless communication system. As those skilled in the art will readily appreciate, various aspects described throughout this disclosure may be extended to other telecommunication systems, network architectures and communication standards. By way of example, various aspects may be extended to UMTS systems such as, TD-SCDMA, W-CDMA, High Speed Downlink Packet Access (HSDPA), High Speed Uplink. Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

While aspects of this invention have been described in conjunction with the example features outlined above, various alternatives, modifications, variations, improvements, and/or substantial equivalents, whether known or that are or may be presently unforeseen, may become apparent to those having at least ordinary skill in the art. Accordingly, the example aspects of the invention, as set forth above, are intended to be illustrative, not limiting. Various changes may be made without departing from the spirit and scope hereof. Therefore, aspects of the invention are intended to embrace all known or later-developed alternatives, modifications, variations, improvements, and/or substantial equivalents.

What is claimed is:

1. A method of communication, comprising:
receiving an indication at a wireless device to initiate an emergency call, wherein receiving includes determining whether a panic button on the wireless device is depressed for at least a threshold period of time;
executing an emergency services software component comprising software instructions stored on a non-removable memory on said wireless device to perform the substeps of,
    determining that the wireless device has a removable memory installed, initiating a call by automatically dialing a number stored on the removable memory, and determining that said number stored on the removable memory is unavailable, and
    automatically dialing 911 based on said determination that said number stored on the removable memory is unavailable, and completing a connection to an emergency service provider via said cellular network;
outputting a visual indicator confirming connection to said emergency service provider;
determining a current location of said wireless device from one or both of a global positioning system or triangulation from said cellular network.

2. The method of claim 1, wherein said step of automatically dialing a number stored on the removable memory comprises dialing a predetermined plurality of numbers stored on a subscriber identity module (SIM) card.

3. A method of communication, comprising:
receiving an indication at a device to initiate an emergency call via a wireless network, wherein receiving further includes determining whether a panic button is depressed for at least a threshold period of time;
executing an emergency services software component comprising software instructions stored on a non-removable memory on said wireless device to perform the substeps of,
    determining that the wireless device has a removable memory installed, automatically dialing a number stored on the removable memory, determining that said number stored on the removable memory is unavailable, outputting a visual indicator corresponding to a connection status to the number stored on the removable memory, automatically dialing 911 based on said determination that said number stored on the removable memory is unavailable and completing a connection to an emergency service provider via the wireless network based at least in part on receiving the emergency indication;
determining a current location of said wireless device from one or both of a global positioning system or triangulation from said wireless network.

4. The method of communication of claim 3, wherein said step of determining that the wireless device has a removable memory installed further comprises:
determining whether the device is configured with a subscriber identity module (SIM) card;
determining if the SIM card includes a plurality of numbers
initiating sequential calling of the plurality of numbers stored on the SIM card based on the determination that the device is configured with the SIM card.

5. The method of claim 4, wherein said step of initiating sequential calling of the plurality of numbers stored on the SIM card based on the determination that the device is configured with the SIM card further comprises:
calling a first number of the plurality of numbers stored on the SIM card;
determining whether the first number is unavailable;
calling a second number of the plurality of numbers stored on the SIM card based on the determination that the first number is unavailable; and
determining whether the second number is unavailable, wherein the device is configured to sequentially call each of the remaining numbers of the plurality of numbers based on the determination that a previously called number is unavailable.

6. The method of claim 5, further comprising:
determining that all of the plurality of numbers stored on the SIM card are unavailable, and initiating said call to said emergency service provider.

7. The method of claim 5, further comprising:
resetting an order of sequentially calling the plurality of numbers stored on the SIM card.

8. An apparatus for communication, comprising:
a removable memory;
a non-removable memory storing executable instructions; and
a processor in communication with the removable memory and the non-removable memory, wherein the processor is configured to execute the instructions to:
detect an emergency indication, wherein the processor configured to detect the emergency indication is further configured to determine whether a panic button is depressed for at least a threshold period of time, wherein depressing the panic button for at least the threshold period of time causes the processor to either power on or off the apparatus or detect the emergency indication;
determine that the removable memory is installed;
connect to a wireless network;
output a visual indicator corresponding to connection status to said wireless network;
automatically dial a number stored on the removable memory and determine that said number stored on the removable memory is unavailable;
automatically dial 911 based on said determination that said number stored on the removable memory is unavailable and establish a call to an emergency service provider via said wireless network.

9. The apparatus of claim 8, wherein determining that the removable memory is installed further comprises:
determining whether the device is configured with a subscriber identity module (SIM) card; and
determining if the SIM card includes a plurality of numbers.

10. The apparatus of claim 9, wherein automatically dialing said number stored on the removable memory comprises initiating sequential calling of a plurality of numbers stored on a SIM card.

11. The apparatus of claim 10, wherein the processor is further configured to execute instructions to initiate a call of an emergency service provider after calling all the plurality of numbers stored on the SIM card.

12. The apparatus of claim 8, wherein initiating a communication with a remote device includes:
initiating a communication with a third party, at a remote location, via the wireless network.

13. The apparatus of claim 12, wherein initiating a communication with an emergency service provider comprises:
initiating a 911 call.

14. The apparatus of claim 8, wherein the remote device comprises a server.

15. The apparatus of claim 8, wherein the processor is further configured to execute instructions to:
determine if a preferred predetermined plurality of numbers, have been stored on the apparatus;
initiate a predetermined sequential calling of the plurality of numbers; and
reset an order of numbers to be sequentially called of the plurality of numbers stored on the apparatus when the apparatus is turned off, wherein resetting the order includes configuring the apparatus to dial a first number of the plurality of numbers first.

16. An apparatus for communication, comprising:
a memory storing executable instructions; and
a processor in communication with the memory, wherein the processor is configured to execute the instructions to:
receive an indication to initiate an emergency call, wherein receiving includes determining whether a panic button on the apparatus is depressed for at least a threshold period of time, wherein depressing the panic button for at least the threshold period of time causes the apparatus to either power on or off or detect the emergency indication;
determining that a removable memory is installed in the apparatus;
automatically dial a predetermined plurality of numbers are stored on the removable memory;
determining that all of the plurality of predetermined plurality of numbers stored on the removable memory are unavailable;
automatically dialing 911 based on said determination that said number stored on the removable memory is unavailable; and
establishing a call with an emergency service provider.

17. The apparatus of claim 16, wherein the removable memory comprises a subscriber identity module (SIM) card.

* * * * *